United States Patent Office 2,811,860
Patented Nov. 5, 1957

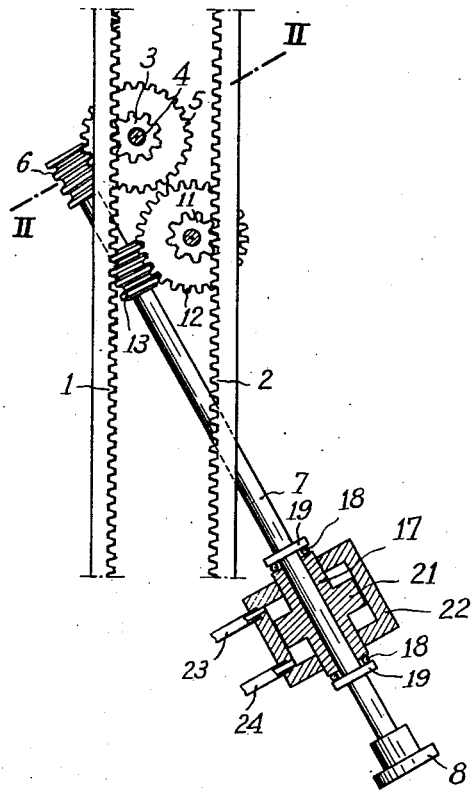
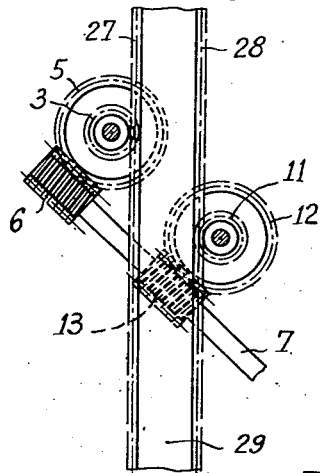
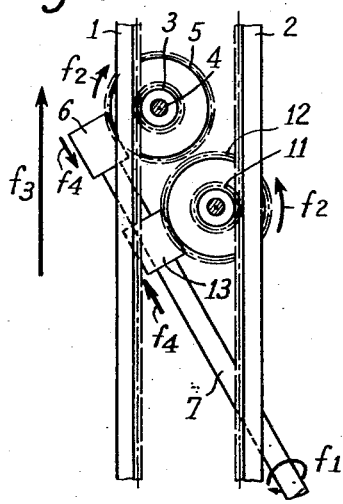
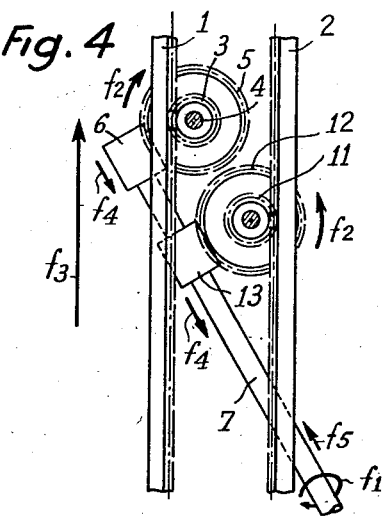
Fig. 1
Fig. 2
Fig. 3
Fig. 4
Fig. 5
INVENTOR
Frederick Charles Gilbert Berthiez
By George H. Cosley
ATTORNEY

2,811,860

DRIVING MECHANISM FOR IMPARTING A RECIPROCAL MOVEMENT TO A MACHINE COMPONENT

Frederick Charles Gilbert Berthiez, Lamorlaye, France, assignor to Societe Anonyme des Anciens Etablissements Charles Berthiez, Paris, France Application December 14, 1954, Serial No. 475,242

Claims priority, application France July 7, 1954

6 Claims. (Cl. 74—409)

This invention relates to a driving mechanism for a machine component to which a reciprocal movement is to be imparted such as, for example, the work-table of a planing or milling machine.

It relates more particularly to drives of the type which comprise a toothed rack integral with the machine component to be driven and in mesh with a pinion which, in turn, is rotated by a worm gearing.

The known drives of this type have the disadvantage of requiring a longitudinal abutment on the shaft which carries the worm and, moreover, they do not allow the play which may exist between the teeth of the rack and those of the pinion to be taken up. This is a serious disadvantage on machines such as milling machines where longitudinal play of the work-table can lead to the breakage of the milling cutters in the milling operations of "sinking."

The invention has for its object a drive of this type which does not offer the aforesaid disadvantages.

The device, therefore, comprises a driving shaft which carries two worms of opposite helical pitch respectively in mesh with two worm wheels, which are operatively connected to two pinions, which are in turn respectively in mesh with two racks, which are integral with the machine component to be driven.

Owing to this arrangement the axial reactions of the two worms balance each other and the shaft carrying them accordingly is not subject to any axial thrust during operation.

In a particular embodiment the teeth of the two racks are formed in two opposite edges of a common member.

According to another feature of the invention, the shaft carrying the two worms is adapted to be displaced slightly in an axial direction under the action of a force exceeding the reaction of the machine component to be displaced upon the shaft. This arrangement allows the play between the teeth of the racks and those of the corresponding pinions to be taken up completely.

In order that the invention may be better understood two embodiments thereof will now be described by way of example, with reference to the accompanying drawings, in which:

Figure 1 shows the assembly of a driving mechanism according to the invention;

Figure 2 is a section along the line II—II of Figure 1;

Figures 3 and 4 show the direction of the reactions of the worm wheels on the worms in two particular cases; and Figure 5 represents a modification of part of the mechanism according to Figure 1.

Referring firstly to Figure 1, two racks 1 and 2 are provided the teeth of which face one another and which are rigidly mounted on the inner face of a component (not shown) to which a reciprocal movement is to be imparted and which may, for example, be the work-table of a milling and planing machine.

The rack 1 is in mesh with a pinion 3 (see also Figure 2) keyed on a vertical shaft 4 on which is also keyed a worm wheel 5 in mesh with a worm 6 integral with a horizontal driving shaft 7 coupled to the driving motor (not shown) by a coupling which comprises for example a coupling member of which a flange 8 is shown in Figure 1.

In an analogous manner the rack 2 is in mesh with a pinion 11 fixedly connected to a worm wheel 12 in mesh with a worm 13 likewise keyed to the driving shaft 7. The pinions 3 and 11 are identical and the two associated worm wheels and worms are of equal dimensions but of opposite helical pitch.

It will now be possible to see that, when the driving shaft 7 is rotated alternately in one sense and the other, a rectilinear reciprocating movement of the two toothed racks 1 and 2 is effected. The two worm wheels 5 and 12 rotate in the opposite sense, in view of the fact that the two worms 6 and 13 are of opposite helical pitch; hence the shaft 7 is not subject to any axial thrust during operation. In fact, when the sense of rotation of the shaft 7 (Figure 3) is denoted by the arrow $f_1$, the pinions and worm wheels rotate in the sense of the arrows $f_2$, while the toothed racks are moved along in the sense of the arrow $f_3$. The reactions of the worm wheels through the worms on the shaft 1 cancel one another out since they are equal and in the opposite sense as indicated by the arrows $f_4$. These operating conditions occur, for example, in planing work performed on the machine.

In order to impart to the work-table an advancing movement without play in the drive, for example, in order to carry out "sinking" milling operations, an arrangement may be provided which allows the shaft 7 to be subjected to a slight longitudinal displacement. To achieve this, the shaft 7 is supported at one of its ends by a sleeve 17 in which it can turn without sliding axially. Two thrust ball bearings 18 are diagrammatically shown interposed between the ends of the sleeve 17 and two collars 19 integral with the shaft 7.

The sleeve 17 has a circular flange 21 which plays the part of a double-acting piston movable in a cylinder 22 provided at its ends with two pipes 23, 24 for the supply and discharge of a pressure fluid such as, for example, oil. It will be seen that this device allows the shaft 7 to be displaced a certain distance along its axis, in one direction or the other, according to whether the pressure oil is supplied through the pipe 23 or through the pipe 24, by means of a suitable conventional distributor (not shown).

When no pressure fluid is supplied to the cylinder 22, the shaft 7 assumes a longitudinal equilibrium position as explained hereinabove which corresponds to the conditions shown in Figure 3.

On the other hand, when pressure fluid is supplied to the cylinder 22 through the pipe 24, a longitudinal thrust is applied to the shaft 7 in the sense of the arrow $f_5$ (Figure 4) and this thrust first of all counteracts the reaction $f_4$ of the worm 6 by advancing the tooth rack 1 in the direction of the arrow $f_3$. However, the pressure supplied is such that the thrust exerted longitudinally by the piston 21 on the shaft 7 exceeds the thrust required for advancing the work-table, in such a manner that the excess thrust tends to turn the pinion 11 in the sense which would displace the toothed rack 2 in the direction opposite to the displacement of the toothed rack 1. It will be understood that in this manner the play between the teeth of the pinions 3 and 11 and the toothed racks 1 and 2, with which they are respectively in mesh is taken up. The rotary movement of the driving shaft 7 will, therefore, be transmitted without play to the toothed racks 1 and 2 integral with the work-table. Thus precision milling operations can be carried out, and the so-called "sinking" feed can be applied.

In Figure 5, a modification of the embodiment of Figure 1 is illustrated which differs from the latter merely by the fact that the two toothed racks 27 and 28 are cut in the outer edges of a single member 29 instead of consisting of two separate members. The functioning of this embodiment is the same as that of the embodiment represented in Figure 1 and it is, therefore, unnecessary to repeat the explanation.

It will be understood that the invention is not limited to the embodiments described and illustrated by way of example, and is capable of numerous modifications obvious to a person skilled in the art, according to the particular application of the invention desired, without departing from the scope of the invention as defined in the following claims.

I claim:

1. A driving mechanism for effecting forward and reverse movements of translation of a machine member, comprising a driving shaft supported for rotation thereof on its axis in a given and the opposite directions of rotation, two worms of opposite hand fixed on said shaft in spaced relation to each other along said shaft, two worm wheels of opposite hand supported for rotation thereof on separate axes and meshing respectively with said two worms, the ratios of said worms to the respective meshing worm wheels being the same, two pinions respectively coaxial with and connected to said worm wheels to rotate therewith, two racks supported in meshing engagement respectively with said pinions and with their lengths extending parallel to a given path of movement and connected together to move as a unit along said path, the ratios of said pinions to the respective meshing racks being the same, said racks so connected being operatively connectible to said member concomitantly to effect movement of said member, said racks being disposed in said meshing engagement with said pinions respectively at the sides of the axes of said pinions that provide for driving both of said racks in the forward and in the reverse directions along said path respectively upon rotation of said shaft on its axis in a selected and in the opposite directions, said shaft and said worms thereon being supported for movement of translation together parallel to said shaft axis for applying to said worm wheels forces tending to produce rotation of said worm wheels and the respective pinions connected thereto in directions tending to produce movement of said racks in opposite directions to maintain said pinions in engagement with the respective racks.

2. A driving mechanism for effecting forward and reverse movements of translation of a machine member supported for said movements thereof in a given path, comprising a driving shaft supported for rotation thereof on its axis in a given and the opposite directions of rotation, two worms of the same form and pitch but of opposite hand fixed on said shaft in spaced relation to each other along said shaft, two worm wheels of the same form and number of teeth and of the same pitch but of opposite hand supported for rotation thereof on separate axes and meshing respectively with said two worms, two pinions of the same pitch diameter respectively coaxial with and connected to said worm wheels to rotate therewith, two racks of the same pitch as the respective pinions and supported with their lengths extending parallel to said path of movement of said machine member and connected to said member to move therewith along said path, said racks being disposed in meshing engagement with said pinions respectively at the sides of the axes of said pinions that provide for driving both of said racks in the forward and in the reverse directions along said path respectively upon rotation of said shaft on its axis in a selected and in the opposite directions, said shaft and said worms thereon being supported for movement of translation together parallel to said shaft axis for applying to said worm wheels forces tending to produce rotation of said worm wheels and the respective pinions in directions tending to produce movement of said racks in opposite directions to maintain said pinions in engagement with the respective racks.

3. A driving mechanism as defined in claim 1, in which both of said worm wheels are disposed at the same side of said shaft with the axes of said worm wheels parallel, said racks being disposed respectively outwardly with respect to the pinions meshing with the respective racks with said pinions disposed between said racks.

4. A driving mechanism as defined in claim 1 in which both of said worm wheels are disposed at the same side of said shaft with the axes of said worm wheels parallel, said racks being disposed respectively inwardly with respect to the pinions meshing with the respective racks with said racks disposed between said pinions.

5. A driving mechanism as defined in claim 1 which comprises means for positively effecting said axial movement of said shaft in a selected direction.

6. A driving mechanism for effecting forward and reverse movements of translation of a machine member, comprising a driving shaft supported for rotation thereof on its axis in a given and the opposite directions of rotation, two worms of opposite hand fixed on said shaft in spaced relation to each other along said shaft, two worm wheels of opposite hand supported for rotation thereof on separate axes and meshing respectively with said two worms, the ratios of said worms to the respective meshing worm wheels being the same, two pinions respectively operatively connected to said worm wheels to rotate concomitantly therewith, two racks supported in meshing engagement respectively with said pinions and with their lengths extending parallel to a given path of movement and connected together to move as a unit along said path, the ratios of said pinions to the respective meshing racks being the same, said racks so connected being operatively connectible to said member concomitantly to effect movement of said member, said racks being disposed in said meshing engagement with said pinions respectively at the sides of the axes of said pinions that provide for driving both of said racks in the forward and in the reverse directions along said path respectively upon rotation of said shaft on its axis in a selected and in the opposite directions, said shaft and said worms thereon being supported for movement of translation together parallel to said shaft axis for applying to said worm wheels forces tending to produce rotation of said worm wheels and the respective pinions connected thereto in directions tending to produce movement of said racks in opposite directions to maintain said pinions in engagement with the respective racks.

References Cited in the file of this patent

UNITED STATES PATENTS

| 330,391 | Gifford | Nov. 17, 1885 |
| 2,533,043 | Price | Dec. 5, 1950 |

FOREIGN PATENTS

| 280,482 | Italy | Dec. 11, 1930 |

OTHER REFERENCES

Machine Design, page 140, May 1953.